United States Patent Office 2,913,427
Patented Nov. 17, 1959

2,913,427

WATER REPELLENT COMPOSITION AND ARTICLE COATED THEREWITH

Edwin B. Michaels, Stamford, Conn., assignor to The Stamford Chemical Company, Stamford, Conn., a corporation of Connecticut No Drawing. Application June 25, 1957
Serial No. 667,987

12 Claims. (Cl. 260—27)

The present invention relates to novel compositions and processes for rendering organic substances water-repellent. More particularly, it is concerned with novel water-repellent compositions containing surface-active, solvent-soluble copolymers defined hereinafter, and to improved processes for imparting water-repellency to fibers, filaments, yarns and fabrics of the natural and synthetic types, and to products so made.

It is of course known that textiles or fabrics can be rendered water-repellent by a variety of hydrophobing compositions. Unfortunately, none has been found wholly satisfactory. An example of one such composition is a solution comprising naphtha, paraffin wax and ester gum or an equivalent wax hardening resin. When the latter composition is applied in the usual manner to a fabric or garment, particularly one that has been previously laundered or dry-cleaned, the treatment is not entirely satisfactory, particularly from a water-repellency viewpoint. Users of such fabrics or garments have found that the treatment does not provide adequate serviceability on exposure to rainfall. It is believed that the bond between the hydrophobic paraffin wax film and the normal fabric surface is not a firm one. Consequently, the relatively weak bond, upon wetting, renders such treatment commercially unattractive.

It is a principal object of this invention to provide serviceable water-repellent fibers, filaments, yarns and fabrics of both the natural and synthetic types.

A further object is to provide an improved process for hydrophobing both natural and synthetic fabrics.

A still furhter object is to provide improved water-repellent compositions and processes to previously dry-cleaned or laundered fabrics.

Other objects and advantages will become apparent to those skilled in the art from a consideration of the ensuing detailed description.

To these ends, surface-active copolymers which are soluble in a variety of organic solvents and prepared by copolymerizing an unsaturated olefinic compound containing a basic nitrogen atom and an oleophilic compound are deposited on a fabric as by dipping or spraying to render it resistant to spotting by water. However, according to this invention, it has been found that effective hydrophobing of the fabric can be adequately realized when the fabric is dipped or sprayed into a solvent solution of copolymer, dried and followed by a treatment with a solvent mixture of a suitable wax and an ester gum or its equivalent. Alternatively, the fabric may be treated with a mixture comprising a solvent, copolymer, a suitable wax and a wax compatible hardening resin, such as limed rosin, polymerized terpene resin or polymerized petroleum resin.

The copolymers of this invention are prepared by methods known in the art. The polymers do not form a part of the invention. However, they may be prepared by copolymerizing catalytically an oleophilic monomer and a basic amino nitrogen monomer in the weight ratio of from 70 to 95 parts of the oleophilic monomer and from 30 to 5 parts of the basic amino nitrogen monomer, respectively. The copolymers are soluble in organic solvents.

The oleophilic monomer may be characterized by the general structure:

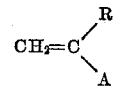

where R is nuclear hydrogen or a methyl radical and A represents the radicals —COOR$^1$, —OR$^1$,

or —OCOR$^1$, in which R$^1$ is a higher alkyl radical of from 8 to 18 carbon atoms.

Illustratively typical of the latter class of oleophilic monomers is any of the compounds:

Octylacrylate
Decylacrylate
Dodecylmethacrylate
Cetylacrylate
Vinyl dodecyl ether
Dodecylstyrene
Vinyl laurylate The basic amino nitrogen monomer may be characterized by the general formula:

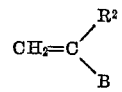

where R$^2$ is nuclear hydrogen or methyl and B represents the substituents:

$$-CO_2(CH_2)_2N(R^3)_2, \quad -O-(CH_2)_2-N(R^3)_2$$

$$-\langle\bigcirc\rangle-CH_2-N(R^3)_2, \quad -CO_2-\langle S \rangle-N(R_3)_2,$$

or

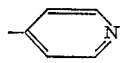

in which R$^3$ is hydrogen or at least one alkyl radical. In the latter class are illustrated the following compounds:

Diethylaminoethyl methacrylate
Vinyl diethylaminoethyl ether
t-Octyl aminoethyl methacrylate
4-dimethylaminomethyl styrene
4-dimethylaminocyclohexyl methacrylate
4-vinyl pyridine In general, when a monomer of each of the above two classes is copolymerized in the indicated proportions and as disclosed, for example, in United States Letters Patent 2,737,452 to Catlin, a soft resinous material results. This copolymer is soluble in a variety of organic solvents, such as aliphatic or aromatic solvents. Illustrative of the latter are naphtha, benzene, toluene, perchlorethylene, xylene and equivalents thereof.

To impart water-repellent properties to the polymers defined above, certain considerations must be observed. First, the copolymers are either solvent solubilized or, alternatively, emulsified. For example, one to ten parts of any copolymer, as illustrated by dodecyl methacrylate (70 to 95 parts) and diethylaminoethyl methacrylate (30 to 50 parts), is dissolved in 1000 parts of naphtha, although any of the previously mentioned solvents may be used.

Next, a mixture of from about 5 to 25 parts by weight of a suitable wax, such as paraffin or beeswax, and from 1 to 15 parts by weight of a previously defined wax-compatible hardening resin is added to the dissolved copolymer while agitating. Alternatively, a mixture of 1 to 10 parts of the above dissolved copolymer, 2 to 10 parts of paraffin wax and 2 to 10 parts of naphtha is emulsified in water. The order of mixing the dissolved copolymer and paraffin or beeswax is not of critical moment. The composition is found markedly effective for water-repelling purposes.

The composition defined above may be additionally enhanced by adding a small amount of an organic acid thereto. For example, of from 0.1 to 1.0 part of acetic acid based on the weight of the copolymer when added to the composition will accelerate the action of the copolymer.

In general, the copolymer solution or emulsion is applied to a fabric by any method presently used in the art. Among such methods may be mentioned: dipping, roll coating or spraying. Pick-up on the fabric of from about 1–15% or higher by weight of the polymeric material based on the weight of the fabric is usually sufficient to either coat or impregnate the fabric, thus rendering it water-repellent. After the fabric has been so treated, it is exposed to a heated atmosphere, such as an oven, in order to drive off the solvent. Usually drying temperatures above room temperature up to about 180° F. are adequate to effect drying.

It is an advantage of the present invention that natural and synthetic fibers are rendered water-repellent by a simplified procedure involving the utilization of the above defined copolymer and a wax. The fabric so treated remains water-repellent after repeated wear and exposure to normal rainfall. It is further a particular advantage of the invention that laundered or dry-cleaned fabrics may be effectively rendered water-repellent with simplicity and ease.

The following examples will serve to more clearly illustrate the invention. These are merely illustrative and are intended not to be construed as being limitative. Unless otherwise stated, the parts given in this specification are by weight.

EXAMPLES

Three typical fabrics are subjected to treatment so as to affect their water-repellency. Designated as No. 1 is a new unlaundered 6 oz. cotton twill fabric. Designated as No. 2, is a 6 oz. cotton twill fabric which has been dry-cleaned using 4% detergent charged naphtha solvent. Designated as No. 3, is an 8 oz. bark cloth. The latter is selected principally because it is substantially resistant to any water-repellent treatment. As indicated in the summary set forth in the table below, these fabrics are treated with sundry water-repellent compositions.

In the examples, the method applied to the above fabrics involves the utilization of swatches usually in the form of seven by seven inch squares. Each swatch is immersed in an appropriate treating bath. It is then removed from the solution bath and placed in a basket centrifuge. Extraction occurs therein and is terminated when the weight of the swatch is uniformly increased to about one-third of the original weight. The extracted fabric is next dried in a circulating air-oven maintained at about 130° F. or hgher. The test squares are ironed and tested by subjecting them to the standard spray test of the American Association of Textile Chemists and Colorists (AATCC).

The control solution which is referred to in the table below comprises the following formulation:

Stoddards type naphtha _____parts (by volume)__ 1000
Paraffin wax (M.P.=65° C.) _____ parts__ 20
Pentaerythritol abietate (M.P.=80–90° C.) do____ 12

It is to be noted that any of a variety of commercially available equivalents for naphtha, paraffin wax as well as pentaerythritol abietate may be used with equal advantage.

Table

| Ex. | Type of treatment | Spray ratings (AATCC) fabric | | |
|---|---|---|---|---|
| | | No. 1[1] | No. 2[2] | No. 3[3] |
| 1 | Fabric untreated | 0 | 0 | 0 |
| 2 | Fabric treated with above control solution bath. | 90 | 50 | 50 |
| 3 | Fabric treated with naphtha solution of 2.5% copolymer dodecyl methacrylate/diethylaminoethyl methacrylate 90/10 in naphtha in the absence of paraffin wax. | 70 | 50 | 50 |
| 4 | Fabric treated with the above control solution and added 1.25% copolymer of Example 3. | 100 | 90 | 80 |
| 5 | Fabric treated with control solution containing 1.25% copolymer of Example 3 plus 0.2% acetic acid. | 100 | 100 | 90 |
| 6 | Fabric treated with the above control solution with added 1.25% copolymer of dodecyl methacrylate/diethylaminoethyl methacrylate (90/10 respectively). | 100 | 90 | 80 |
| 7 | Fabric treated with an emulsion of 1% copolymer of Example 3 plus 5% paraffin wax plus 1% naphtha in water. | 100 | 100 | 90 |
| 8 | Fabric treated with 0.8% copolymer of dodecylmethacrylate/diethylamino methacrylate 80/20 with 0.2% acetic acid added to control solution bath. | 100 | 100 | 90 |
| 9 | Fabric pretreated with a naphtha solution containing 0.5% of copolymer of Example 3 removing excess solvent and then treating with above control solution bath. | 90 | 90 | 80 |

[1] New cotton twill.
[2] Dry-cleaned cotton twill.
[3] Bark cloth.

It will be appreciated from the foregoing table which summarizes the superior effects of the compositions of the present invention that Examples 4 to 9 inclusive demonstrate enhanced water-repellency when applied to typical fabrics. The AATCC spray ratings in each of these examples are substantially higher than for the treated fabrics shown in Examples 2 and 3. As is known, the higher the AATCC rating, the more effective and desirable the treatment.

Although the copolymer employed in the above examples comprise the polymer of dodecyl methacrylate and diethylamino methacrylate, other previously defined copolymers have been employed with similar enhanced results.

I claim:

1. In a process for rendering matter in the form of a fiber, filament, yarn and fabric water repellent by treating the same with a resinous composition the improvement comprising the steps of: applying to said matter a water repellent liquid composition containing a mixture essentially of: (a) from about one to about ten parts by weight of a copolymer dissolved in about 1000 parts by volume of a compatible organic solvent therefor, said copolymer being prepared by copolymerizing of from about 70 to about 95 parts by weight of an oleophilic monomer characterized by the formula:

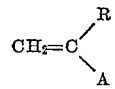

in which R is a radical selected from the group consisting of hydrogen and methyl and in which A is a substituent taken from the group consisting of —COOR¹, —OCOR¹, —OR¹ and

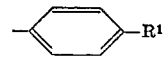

in which R¹ is an alkyl radical of 8 to 18 carbon atoms, and of from about 5 to about 30 parts by weight of a basic amino monomer represented by the general formula:

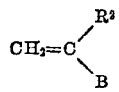

in which R² is a radical selected from the group consisting of hydrogen and methyl and in which B is a substituent selected from the group consisting of

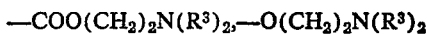
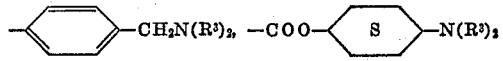
and
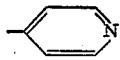

in which $R^3$ is a radical consisting of hydrogen and lower alkyl, (b) from about five to about twenty-five parts by weight of a wax-like substance selected from the group consisting of paraffin and beeswax, and (c) from about one to about fifteen parts by weight of a compatible wax hardening resin selected from the group consisting of ester gum, pentaerythritol abietate, limed rosin, polymerized terpene resin and polymerized petroleum resin, and thereafter drying the matter so-treated whereby from about one to about fifteen percent by weight of said copolymer adheres thereto.

2. A process according to claim 1 in which the material to be treated is a fabric.

3. A process according to claim 1 in which the material to be treated is a dry-cleaned fabric.

4. A process according to claim 1 in which the water repellent mixture is applied to said matter by the immersion of the matter in said liquid water repellent mixture containing of from 0.1 to 1.0 part of acetic acid, based on weight of said copolymer.

5. A process according to claim 1 in which the copolymer is prepared by copolymerizing of from about 70 to about 95 parts of dodecyl methacrylate and from about 5.0 to about 30 parts of diethylaminoethyl methacrylate, all on a weight basis.

6. A process according to claim 1 in which the copolymer is prepared by the copolymerization of 90 parts by weight of dodecyl methacrylate and 10 parts by weight of diethylaminoethyl methacrylate and the organic solvent is naphtha.

7. A process according to claim 1 in which the wax substance is paraffin and the wax compatible hardening resin is pentaerythritol abietate.

8. In a process for rendering matter in the form of a fiber, filament, yarn and fabric water repellent by treating the same with a resinous composition, the improvement comprising the steps of: applying to said matter an aqueous emulsion of a water repellent composition containing a mixture essentially of: (a) from about one to about ten parts by weight of a copolymer, prepared by copolymerizing of from about 70 to about 95 parts by weight of an oleophilic monomer characterized by the formula:

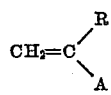

in which R is a radical selected from the group consisting of hydrogen and methyl and in which A is a substituent taken from the group consisting of —COOR¹, —OCOR¹, —OR¹ and

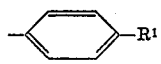

in which $R^1$ is an alkyl radical of 8 to 18 carbon atoms, and of from about 5 to about 30 parts by weight of a basic amino monomer represented by the general formula:

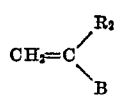

in which $R^2$ is a radical selected from the group consisting of hydrogen and methyl and in which B is a substituent selected from the group consisting of

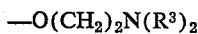
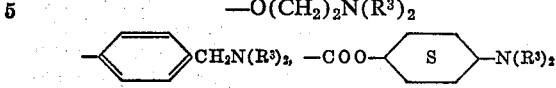
and
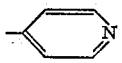

in which $R^3$ is a radical consisting of hydrogen and lower alkyl, dissolved in an organic solvent therefor, said copolymer to solvent being present in a ratio of from about one to ten parts by weight of said copolymer to about 1000 parts by volume of solvent, (b) from about two to about ten parts of a paraffin wax, (c) from about two to ten parts by volume of a compatible organic solvent for said copolymer, and (d) sufficient water to form an emulsion, and thereafter drying the matter so-treated whereby from about one to about fifteen percent by weight of said copolymer adheres thereto.

9. A novel composition adapted for rendering matter in the form of a fiber, filament, yarn and fabric water repellent comprising essentially a mixture of: (a) from one to about ten parts by weight of a copolymer dissolved in a compatible organic solvent therefor, said copolymer being prepared by copolymerizing of from about 70 to about 95 parts by weight of an oleophilic monomer characterized by the formula:

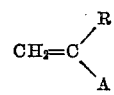

in which R is a radical selected from the group consisting of hydrogen and methyl and in which A is a substituent taken from the group consisting of —COOR¹, —OCOR¹, —OR¹ and

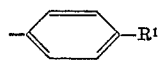

in which $R^1$ is an alkyl radical of 8 to 18 carbon atoms, and of from about 5 to about 30 parts by weight of a basic amino monomer represented by the general formula:

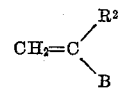

in which $R^2$ is a radical selected from the group consisting of hydrogen and methyl and in which B is a substituent selected from the group consisting of —COO(CH₂)₂N(R³)₂, —O(CH₂)₂N(R³)₂
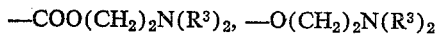
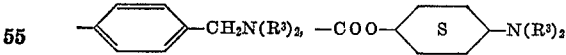
and
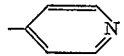

in which $R^3$ is a radical consisting of hydrogen and lower alkyl, (b) from about five to about twenty-five parts by weight of a wax substance selected from the group consisting of paraffin and beeswax and (c) from about one to about fifteen parts of a compatible wax hardening resin selected from group consisting of ester gum, pentaerythritol abietate, limed rosin, polymerized terpene resin and polymerized petroleum resin.

10. The novel composition of claim 9 in which the organic solvent is naphtha, the wax substance is paraffin, the wax compatible hardening resin is pentaerythritol abietate and the copolymer is prepared by reacting of from about 70 to about 95 parts by weight of dodecyl methacrylate and from about 5 to about 30 parts by weight of diethylaminoethyl methacrylate.

11. The novel composition of claim 10 in which the copolymer is prepared by the copolymerization of 90 parts by weight of dodecylmethacrylate and 10 parts by weight of diethylaminoethyl methacrylate.

12. A novel composition adapted for rendering matter in the form of a fiber, filament, yarn and fabric, water repellent comprising an aqueous emulsion of a mixture containing essentially of: (a) from about one to about ten parts by weight of a copolymer, prepared by copolymerizing of from about 70 to about 95 parts by weight of an oleophilic monomer characterized by the formula:

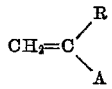

in which R is a radical selected from the group consisting of hydrogen and methyl and in which A is a substituent taken from the group consisting of —COOR$^1$, —OCOR$^1$, —OR$^1$ and

in which R$^1$ is an alkyl radical of 8 to 18 carbon atoms, and of from about 5 to about 30 parts by weight of a basic amino monomer represented by the general formula:

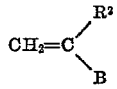

in which R$^2$ is a radical selected from the group consisting of hydrogen and methyl and in which B is a substituent selected from the group consisting of

—COO(CH$_2$)$_2$N(R$^3$)$_2$, —O(CH$_2$)$_2$N(R$^3$)$_2$

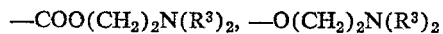

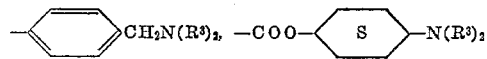

and

in which R$^3$ is a radical consisting of hydrogen and lower alkyl, dissolved in an organic solvent therefor, (b) from about two to about ten parts of a paraffin wax, (c) from about two to ten parts by volume of a compatible organic solvent for said copolymer, and (d) sufficient water to form an emulsion of said components (a), (b) and (c) as immediately defined.

References Cited in the file of this patent

UNITED STATES PATENTS

| | | |
|---|---|---|
| 2,137,636 | Barrett | Nov. 22, 1938 |
| 2,169,366 | Meigs | Aug. 15, 1939 |
| 2,808,349 | Melamed | Oct. 1, 1957 |